(12) United States Patent
Trybus

(10) Patent No.: US 6,588,086 B2
(45) Date of Patent: Jul. 8, 2003

(54) METHOD OF MACHINING PLASTIC SOFT FOAM BLOCKS

(76) Inventor: John Trybus, 24366 Westmoreland, Farmington Hills, MI (US) 48336

( * ) Notice: Subject to any disclaimer, the term of this patent is extended or adjusted under 35 U.S.C. 154(b) by 68 days.

(21) Appl. No.: 09/955,666

(22) Filed: Sep. 18, 2001

(65) Prior Publication Data

US 2003/0051333 A1 Mar. 20, 2003

(51) Int. Cl.7 .................................................. B26F 1/38
(52) U.S. Cl. ........................................ 29/557; 408/1 R
(58) Field of Search ....................... 29/423, 424, 527.1, 29/530, 557, 558, 27 R, 27 C, 34 R; 408/1 R

(56) References Cited

U.S. PATENT DOCUMENTS 4,946,320 A * 8/1990 VanderMay ................ 408/1 R

* cited by examiner

Primary Examiner—Gregory Vidovich
Assistant Examiner—Jermie E. Cozart
(74) Attorney, Agent, or Firm—John R. Benefiel

(57) ABSTRACT

A method of accurately and consistently machining opposite sides of a plastic soft foam block to form a core of an automotive seat includes the step of routing a contour recessed into one side of the block, filling a cavity formed during the routing with a granular material, preferably material generated by the routing process, retaining the material with a covering as the block is inverted, and routing a second contour into the opposite side.

3 Claims, 3 Drawing Sheets

METHOD OF MACHINING PLASTIC SOFT FOAM BLOCKS

BACKGROUND OF THE INVENTION

This invention concerns machining of soft plastic foam material. Such material is commonly used for the care of automotive seats, which are manufactured by molding in a well known manner.

Automotive seats are often reconfigured for the various car models. The design process involves constructing prototypes for testing and evaluation. Since the tooling for molding the seat core is very costly, the prototypes are constructed by other methods. Hand sculpting of blocks of soft foam has typically been done in this industry, but this approach does have limitations as to accuracy and consistency and is slow and requires painstaking attention. It is getting more difficult to obtain the services of suitably skilled and careful craftsman.

Machining of the foam by suitably programmed CNC machine tools has also been practiced but this has also presented problems in achieving the required accuracy at a reasonable cost.

One difficulty is created by the easily compressible characteristic of the soft polyurethane foam used for seat cores and the nature of the seat shape. A large block of plastic is machined on one side to remove material to form one side of the seat shape. The block is reversed and the opposite contour machined into the reverse side of the block. It has been discovered by the present inventor that minute deflections of the foam material caused by the forces imposed by the cutting tool creates significant inaccuracies in the contour machined on the reverse side after the first contour has been machined due to the slight but significant reduction in stiffness occurring as a result of the removal of some of the foam material from the side first machined. That is, deflections of the foam material away from the cutting tool causes inaccuracies in the contour sought to be machined into the block.

It is an object of the present invention to provided a low cost but consistently accurate method of machining soft plastic foam material.

SUMMARY OF THE INVENTION

The above recited object and other objects which will be appreciated upon a reading of the following specification and claims are achieved by carrying out automated routing on low cost CNC router table using a burr type contouring tool to route one side of block of soft foam material having its sides clamped on the table by angles secured to the table top. Upon completing of the machining of one side of the block, the resulting cavity is packed with a granular filler material, advantageously the granular material produced by machining the block. The packed machined side is then covered with sheet plastic to confine the material in the cavity when it is turned over to expose the opposite unmachined side of the block.

Routing of the contour into the opposite side then takes place, with the packing yielding satisfactory accuracy due to the enhanced stiffness of the upward facing side of the block.

DESCRIPTION OF THE DRAWING FIGURES

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
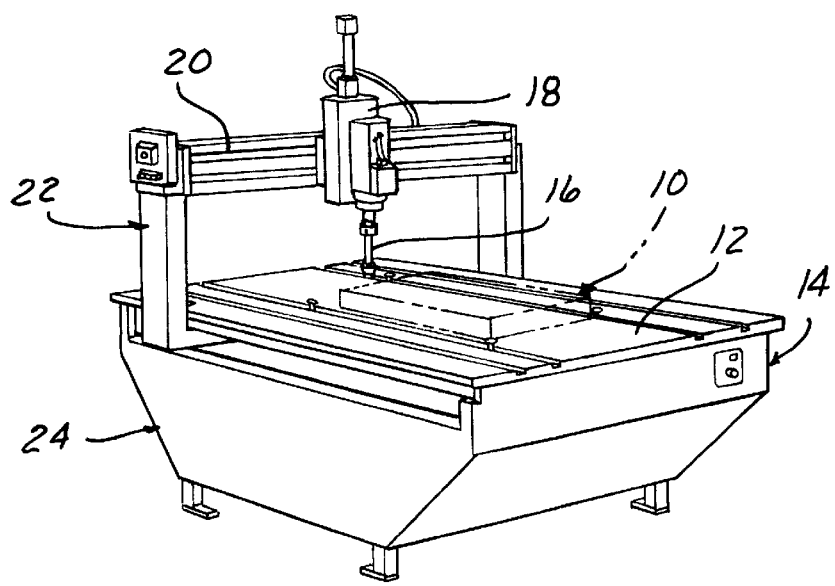
FIG. 1 is a perspective view of a CNC routing table of a type suitable for practice of the method of the invention, with a plastic soft foam block shown in phantom lines in position to be machined.

Referring to the drawings, and particularly FIG. 1, a polyurethane plastic soft foam block 10 from which a seat core prototype is to be machined is shown clamped to the table work surface 12 of a CNC router 14. Such CNC routers are commercially available for use in machining plastics, wood, aluminum, or brass. A router tool 16 is positioned in an X-Y plane by a carriage 18 movable on a cross beam 20 of a gantry 22, which in turn is movable in an orthogonal direction on a base 24.

The rotary tool 16 is mounted on the carriage 28 so as to be vertically positionable. Suitably programmed CNC controls (not shown) cause driving of the gantry 22, carriage 18 and tool 16 in the well known manner to cause the tool 16 to be moved to execute a particular contouring program on the soft foam block 10.

Such a CNC router is available from TECHNO-ISEL (Model H 839) at relatively low cost compared to conventional metal working machining centers.

The router tool 16 is suitable for effectively cutting soft foam, a burr-type tool from L. R. Oliver & Co. of Fairhaven, Mich. having been found particularly effective for machining soft plastic foam.

Figure 2:
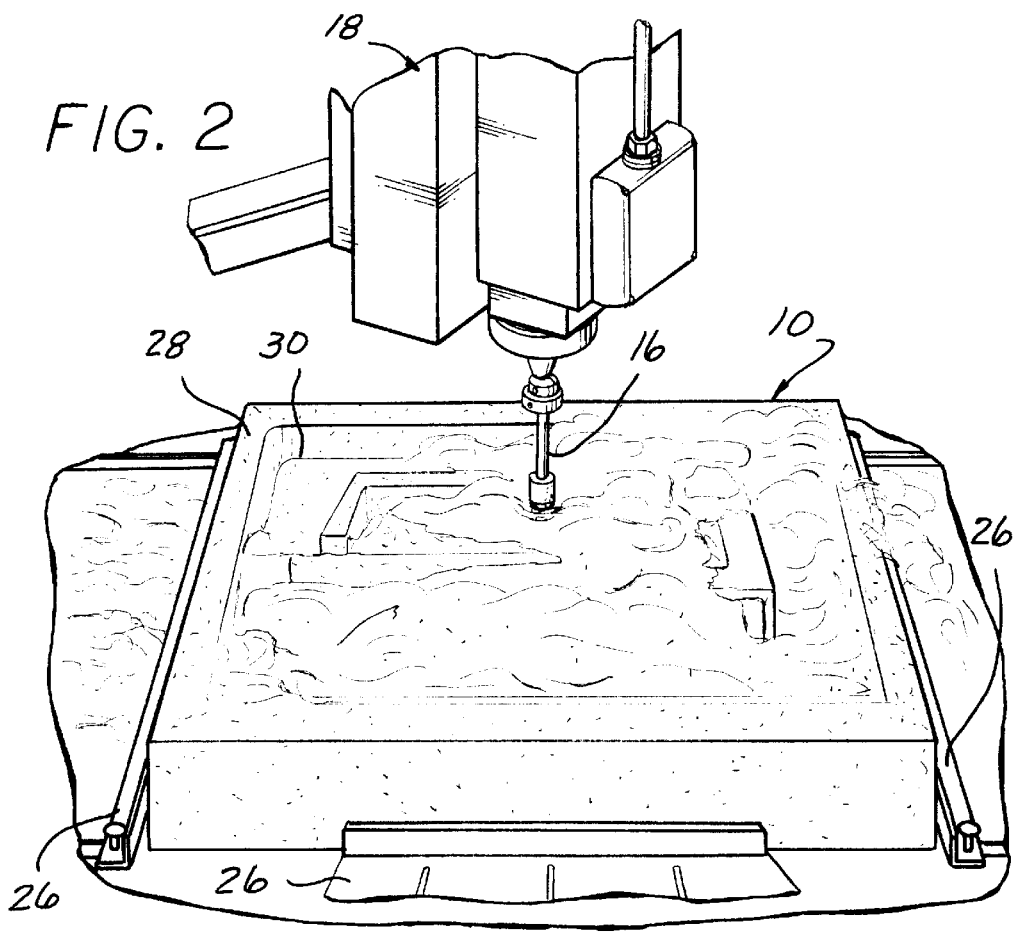
FIG. 2 is an enlarged perspective view of the plastic soft foam block having one side being machined.
Figure 3:
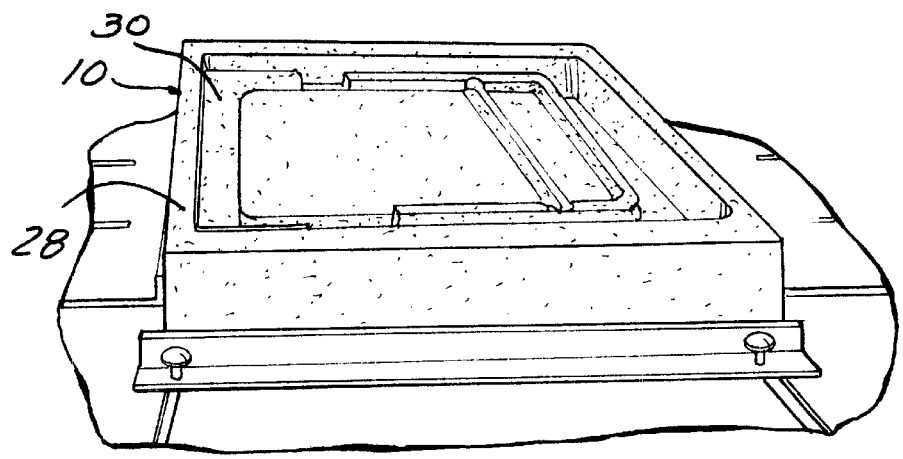
FIG. 3 is a perspective view of the plastic soft foam block shown in FIG. 2 after completion of machining of the upper side.

As seen in FIG. 2, the plastic soft foam block 10 is clamped between angles 26 secured to the table surface 12. The routing tool 16 is driven by the programmed software controls while being rotated at 10,000 rpm to cut a contour into the upper side 28 of the block 10. This creates a cavity 30 recessed into the upper side (FIG. 3) defined by an outer perimeter formed by the unrouted upper side 36.

Figure 4:
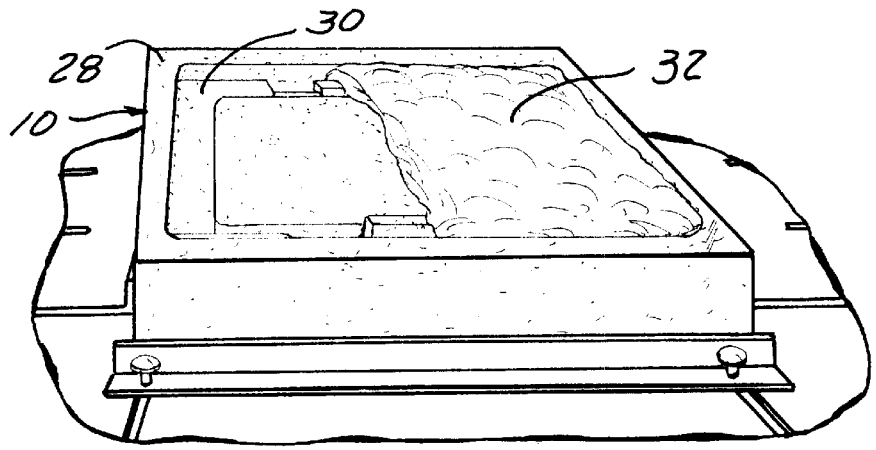
FIG. 4 is a perspective view of the plastic soft foam block shown in FIG. 3 in the process of having the routed out cavity packed with granular filler material.
Figure 5:
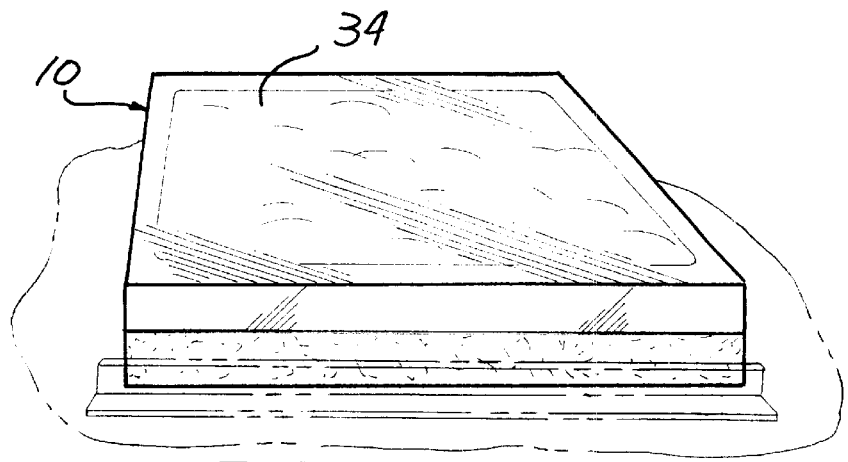
FIG. 5 is a perspective view of the plastic soft foam block shown in FIG. 4 having its upper side covered to retain the granular material in the routed contour cavity.

According to the method of the present invention, the cavity 30 is filled with a granular material 32 so as to reinforce the foam material and substantially restore, FIG. 4 showing this step partially completed.

The routing process itself creates granular cuttings as can be seen in FIG. 2. It has been found that this material is effective for the purpose of the invention.

After completely filling the cavity with the granular material, a plastic sheet 34 is installed tightly covering the cavity 30 and upper side 28.

Figure 6:
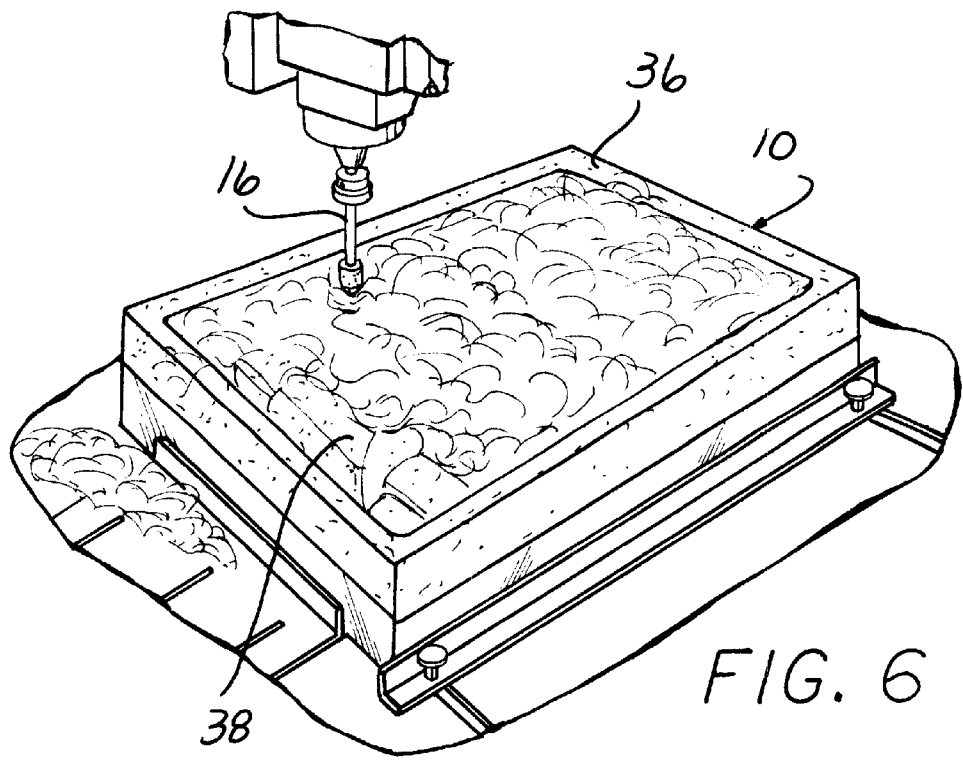
FIG. 6 is a perspective view of the partially contoured plastic foam block shown in FIG. 5 inverted, and the reverse side being routed.

The foam block 10 is then inverted and reclamped, and the opposite side 36 routed as shown in FIG. 6, to form a contour 38 within a cavity 40 therein, comprising the opposite surface of a seat core.

It has been found that by filling the first machined cavity 30 with granular material, and retaining the material therein, sufficient stiffness of the block is achieved that good accuracy in routing the contour 38 results.

Figure 7:
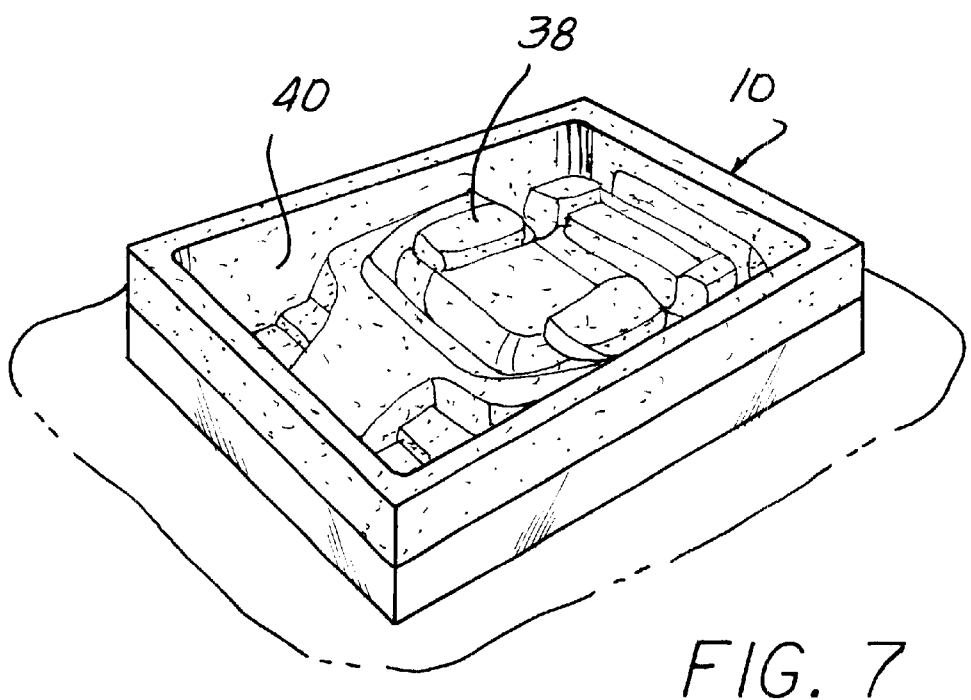
FIG. 7 is a perspective view of the plastic soft foam block shown in FIG. 6 after completion of the contouring.

The new double contoured block 10 (FIG. 7) can then have its perimeter trimmed by a final step (not shown) to complete seat core.

Prototypes which are consistently accurately shaped have been able to be produced by this method at a relatively low cost compared to previous methods.

What is claimed is:

1. A method of machining a soft plastic foam block to contour opposite sides of said block to enable production of a contoured part, comprising the steps of:

clamping said plastic soft foam block to a table of a CNC router with one side thereof facing up;

routing a contoured surface into said one side so as to form a cavity recessed into said one side with a perimeter formed by unrouted portions of said one side;

filling said cavity with a granular material;

covering said one side so as to retain said granular material in said cavity as said soft foam plastic block is unclamped and inverted onto said table with the other side of said soft plastic foam block facing up, and then reclamped; and routing a second contour into said other side of said soft foam plastic block.

2. The method according to claim 1 wherein granular material created by routing soft foam plastic is used to fill said cavity.

3. The method according to claim 1 wherein said routed contours together comprise opposite surfaces of an automotive seat core.

* * * * *